United States Patent
Yoshida (10) Patent No.: US 10,015,363 B2
(45) Date of Patent: Jul. 3, 2018

(54) IMAGE READING DEVICE, IMAGE FORMING APPARATUS, AND IMAGE FORMING SYSTEM

(71) Applicant: KYOCERA Document Solutions Inc., Osaka (JP)

(72) Inventor: Masaya Yoshida, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/630,512

(22) Filed: Jun. 22, 2017

(65) Prior Publication Data

US 2017/0374232 A1    Dec. 28, 2017

(30) Foreign Application Priority Data

Jun. 28, 2016    (JP) .................... 2016-127681

(51) Int. Cl.
| | |
|---|---|
| *G06K 15/00* | (2006.01) |
| *H04N 1/44* | (2006.01) |
| *H04N 1/00* | (2006.01) |
| *H04N 1/10* | (2006.01) |
| *H04N 1/203* | (2006.01) |

(52) U.S. Cl.
CPC ....... *H04N 1/4426* (2013.01); *H04N 1/00344* (2013.01); *H04N 1/00806* (2013.01); *H04N 1/1061* (2013.01); *H04N 1/2038* (2013.01); *H04N 2201/0094* (2013.01)

(58) Field of Classification Search
USPC ....................................... 358/1.14
See application file for complete search history.

(56) References Cited

U.S. PATENT DOCUMENTS

| | | | | |
|---|---|---|---|---|
| 2010/0002249 | A1* | 1/2010 | Nuggehalli | G06F 21/554 358/1.14 |
| 2012/0147410 | A1* | 6/2012 | Tan | G06F 21/608 358/1.14 |
| 2015/0269464 | A1* | 9/2015 | Atsumi | G06K 15/4095 358/1.16 |

FOREIGN PATENT DOCUMENTS

JP    H08-044261 A    2/1996

* cited by examiner

*Primary Examiner* — Moustapha Diaby
(74) *Attorney, Agent, or Firm* — Studebaker & Brackett PC (57) ABSTRACT

An image reading device includes a placement section, a reader, an authentication control section, and a reading control section. A document and an identification medium are placed on the placement section. The reader reads the document and the identification medium and generates image data. The authentication control section performs authentication of a user based on image data of the identification medium and generates authentication information that indicates a result of authentication of the user. The reading control section controls the reader. The reading control section controls the reader to read the document after generating the image data of the identification medium. The authentication control section starts authentication of the user after the image data of the identification medium is generated.

11 Claims, 9 Drawing Sheets

FIG. 9

IMAGE READING DEVICE, IMAGE FORMING APPARATUS, AND IMAGE FORMING SYSTEM

INCORPORATION BY REFERENCE

The present application claims priority under 35 U.S.C. § 119 to Japanese Patent Application No. 2016-127681, filed on Jun. 28, 2016. The contents of this application are incorporated herein by reference in their entirety.

BACKGROUND

The present disclosure relates to an image reading device, an image forming apparatus, and an image forming system.

A copier includes a scanner, a comparing section, and a memory. The scanner reads a document and a user's department ID card. In a situation in which bit information of the department ID card read by the scanner is identical with bit information stored in the memory, the comparing section cancels a copy forbidding state of the copier.

SUMMARY

An image reading device according to the present disclosure includes a placement section, a reader, an authentication control section, and a reading control section. A document and an identification medium are placed on the placement section. The reader reads the document and the identification medium and generates image data of the document and image data of the identification medium. The authentication control section performs authentication of a user based on the image data of the identification medium and generates authentication information that indicates a result of the authentication of the user. The reading control section controls the reader. The reading control section controls the reader to read the document after generating the image data of the identification medium.

An image forming apparatus according to the present disclosure includes the image reading device described above and an image forming device. The image forming device forms an image on a recording medium based on the image data of the document.

An image forming system according to the present disclosure includes an image forming apparatus and a server device. The server device is connected to the image forming apparatus via a communication network. The image forming apparatus includes an image reading device, an image forming device, and a first communication section. The image forming device forms an image on a recording medium based on image data of a document. The first communication section sends image data of an identification medium to the server device. The image reading device includes a placement section, a reader, and a reading control section. The document and the identification medium are placed on the placement section. The reader reads the document and the identification medium and generates image data of the document and image data of the identification medium. The reading control section controls the reader. The server device includes an external storage section, an authentication section, and a second communication section. The external storage section stores personal data therein. When receiving the image data of the identification medium from the image forming apparatus, the authentication section performs authentication of a user based on the personal data and the image data of the identification medium and generates authentication information that indicates a result of the authentication of the user. The second communication section sends the authentication information to the image forming apparatus. The reading control section controls the reader to read the document after generating the image data of the identification medium.

DETAILED DESCRIPTION

The following describes embodiments of the present disclosure with reference to the drawings. However, the present disclosure is not limited to the embodiments described below. Note that elements that are the same or substantially equivalent are labelled using the same reference signs in the drawings and explanation thereof will not be repeated.

Figure 1:
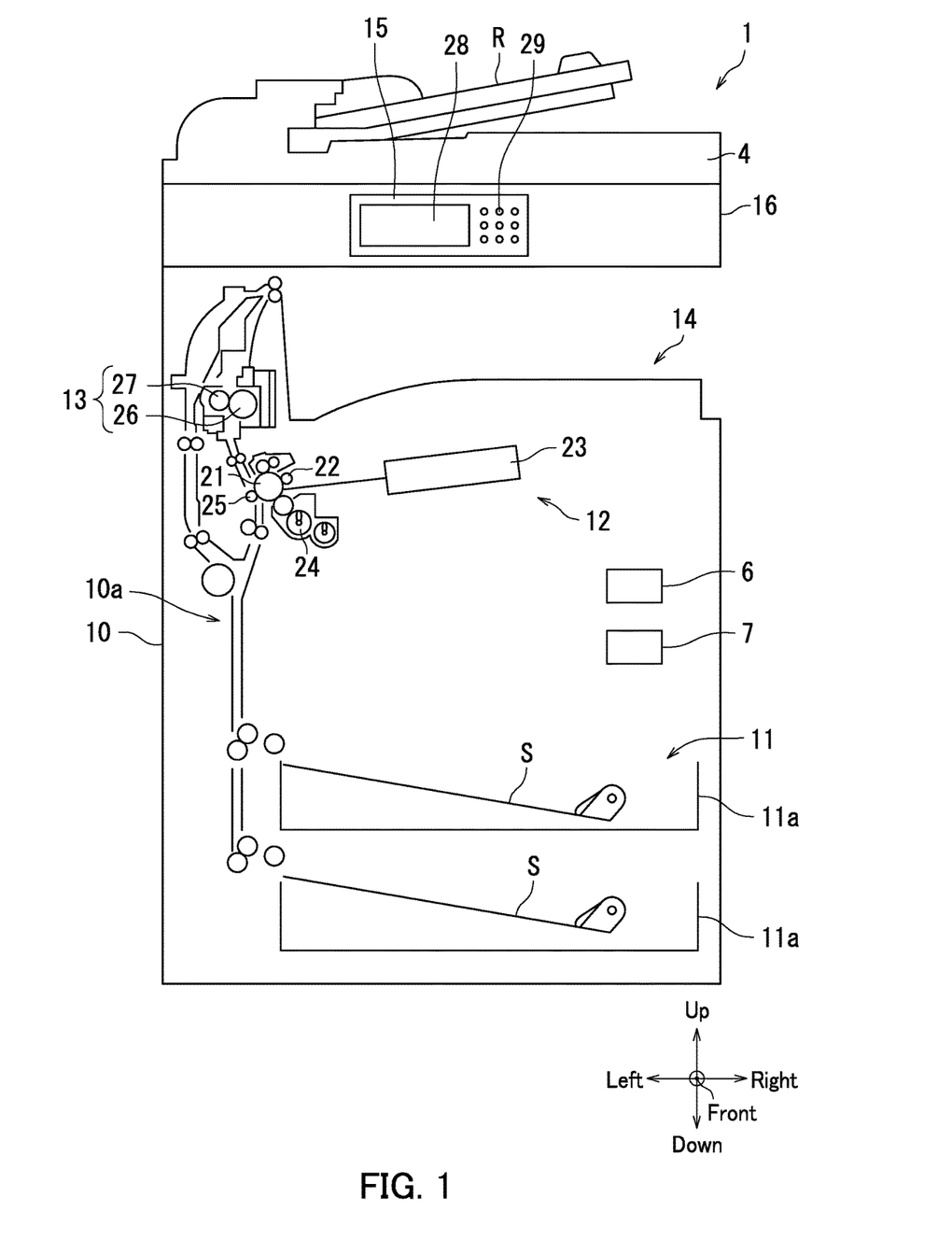
FIG. 1 is a diagram illustrating a configuration of an image forming apparatus according to an embodiment of the present disclosure.

An image forming apparatus 1 according to an embodiment of the present disclosure will be described with reference to FIGS. 1 to 8. FIG. 1 is a diagram illustrating a configuration of the image forming apparatus 1 according to the embodiment of the present disclosure.

As illustrated in FIG. 1, the image forming apparatus 1 according to the present embodiment is a multifunction peripheral having a copy function. Note that the multifunction peripheral has for example at least one of a printer function and a facsimile function in addition to the copy function.

The image forming apparatus 1 forms an image on paper S. The paper S is an example of a recording medium in the present disclosure. Examples of the paper S include plain paper, copy paper, recycled paper, thin paper, thick paper, glossy paper, and overhead projector (OHP) paper.

The image forming apparatus 1 includes a housing 10, an accommodation section 11, an image forming device 12, a fixing section 13, an exit tray 14, an operation panel 15, an image reading device 16, an automatic document feeder 4, a controller 6, and a storage section 7. The paper S is conveyed from the accommodation section 11 to the exit tray 14 along a paper conveyance path 10a.

In FIG. 1, a front-rear direction is defined by determining that the operation panel 15 is facing to the front. Also, a left-right direction is defined by determining that the left as viewed from a position facing the front face of the image forming apparatus 1 is the left. Further, an up-down direction is defined as a direction orthogonal to the front-rear direction and the left-right direction.

The housing 10 houses the accommodation section 11, the image forming device 12, the fixing section 13, the controller 6, and the storage section 7. The housing 10 has a left top surface and a right top surface. The right top surface is lower than the left top surface in the up-down direction. The left top surface is in contact with an undersurface of the image reading device 16 and supports the image reading device 16.

The accommodation section 11 includes a plurality of cassettes 11a. The cassettes 11a are located in a lower part of the image forming apparatus 1. The cassettes 11a are each detachable from and attachable to the housing 10. Also, the cassettes 11a are each capable of accommodating a plurality of sheets of the paper S. Note that the accommodation section 11 may further include a manual feed tray.

The image forming device 12 is located downstream of the accommodation section 11 in the paper conveyance path 10a in terms of a conveyance direction of the paper S. The image forming device 12 forms a toner image on the paper S. The image forming device 12 includes a photosensitive drum 21, a charger 22, a light exposure section 23, a development section 24, and a transfer section 25. The photosensitive drum 21 is disposed rotatably. The photosensitive drum 21 includes for example a conductive substrate and a photosensitive layer. The conductive substrate has electrical conductivity and a hollow cylindrical shape. The photosensitive layer is disposed on an outer circumferential surface of the conductive substrate.

The charger 22 charges the photosensitive drum 21 to a specific potential. The light exposure section 23 irradiates the outer circumferential surface of the charged photosensitive drum 21 with laser light to form an electrostatic latent image thereon. The electrostatic latent image is formed based on for example image data of a document R generated by the image reading device 16.

The development section 24 develops the electrostatic latent image into a toner image. As a result, the toner image is formed on the outer circumferential surface of the photosensitive drum 21. The transfer section 25 transfers the toner image to the paper S. The transfer section 25 includes a transfer roller that forms a nip part together with the photosensitive drum 21. The transfer roller transfers the toner image to the paper S while the paper S is passing between the transfer roller and the photosensitive drum 21.

The fixing section 13 is located downstream of the image forming device 12 in the paper conveyance path 10a in terms of the conveyance direction of the paper S. The fixing section 13 includes a heating roller 26 and a pressure roller 27. The heating roller 26 and the pressure roller 7 apply heat and pressure to the paper S with the toner image transferred thereto to fix the toner image on the paper S. The paper S with the toner image fixed thereon is placed on the exit tray 14.

Figure 2:
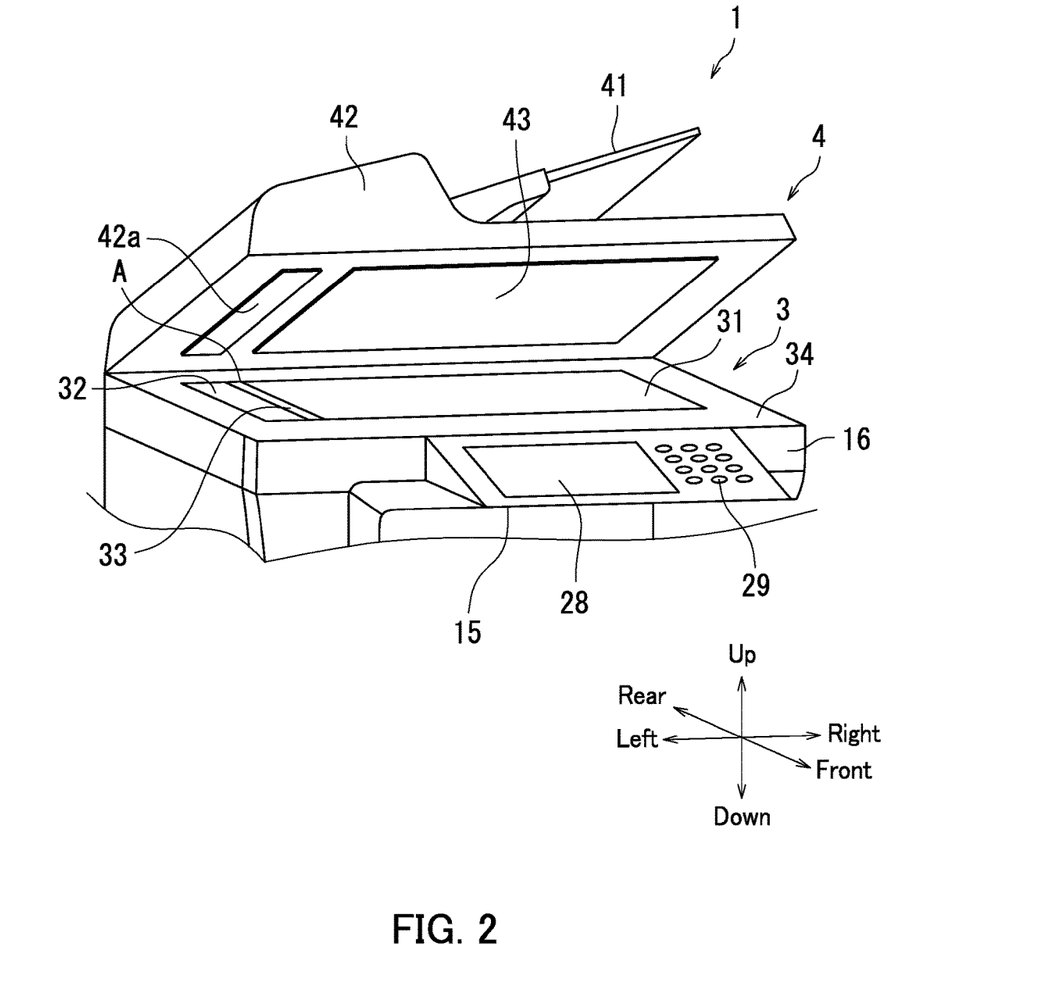
FIG. 2 is an enlarged perspective view illustrating a vicinity of an image reading device of the image forming apparatus illustrated in FIG. 1.

FIG. 2 is an enlarged perspective view illustrating a vicinity of the image reading device 16 of the image forming apparatus 1. As illustrated in FIG. 2, the operation panel 15 includes a display 28 and an input section 29. The input section 29 includes a hard key. The input section 29 outputs to the controller 6 an operation signal corresponding to an operation performed by a user. The operation performed by a user is for example an operation for specifying various settings for the image forming apparatus 1.

The display 28 includes a display and a touch sensor. The display is for example a liquid crystal display (LCD) or an organic electro luminescence display (ELD). The display 28 displays various setting screens for the image forming apparatus 1 under control by the controller 6. The display 28 in the present embodiment also functions as a notification section that presents a message to the outside. The display 28 displays a message such as "Authentication failed." or "Try reauthentication?" under control by the controller 6.

The image reading device 16 includes a placement section 3. The image reading device 16 reads images from a document R and an identification medium D and generates image data. The identification medium D has for example a rectangular plate-like shape. Personal data including for example a face photograph and a personal number such as an employee number or a student number is printed on the identification medium D. The identification medium D is for example an employee ID card, a student ID card, a driver's license, or an insurance card.

The placement section 3 is located at a top surface of the image reading device 16. The document R and the identification medium D are placed on the placement section 3. The placement section 3 includes a first contact glass 31, a second contact glass 32, a partition 33, and a frame 34.

The first contact glass 31 includes a transparent plate-like glass. The first contact glass 31 is located at the center of the placement section 3. A longitudinal direction of the first contact glass 31 coincides with the left-right direction.

The document R or the identification medium D is placed on the first contact glass 31. When the document R is placed on the first contact glass 31, a side of the document R to be read is in contact with an upper surface of the first contact glass 31. When the identification medium D is placed on the first contact glass 31, a side of the identification medium D on which the personal data is printed is in contact with the upper surface of the first contact glass 31. The document R and the identification medium D are placed on the first contact glass 31 preferably by referencing a reference point A marked at a position on the frame 34 located left rear of the first contact glass 31.

The second contact glass 32 includes a transparent plate-like glass. The second contact glass 32 is located on the left of the first contact glass 31. A longitudinal direction of the second contact glass 32 coincides with the front-rear direction. The partition 33 is located between the first contact glass 31 and the second contact glass 32. The frame 34 surrounds the first contact glass 31, the second contact glass 32, and the partition 33. Note that the first contact glass 31 and the second contact glass 32 may be formed integrally so as to be continuous with each other beneath the partition 33.

The identification medium D is placed on the second contact glass 32. When the identification medium D is placed on the second contact glass 32, the side of the identification medium D on which the personal data is printed is in contact with an upper surface of the second contact glass 32.

The automatic document feeder 4 is openable and closable relative to the placement section 3. Specifically, the automatic document feeder 4 includes a document feeding tray 41, a conveyance section 42, a contact section 43, and a document exit tray. The automatic document feeder 4 is attached to the image reading device 16 via a rotary shaft. The automatic document feeder 4 is turnably supported by the image reading device 16 via the rotary shaft. The rotary shaft is located at the rear end of the automatic document feeder 4. Therefore, the automatic document feeder 4 is openable and closable in the up-down direction by turning about its rear end as a pivot axis. When the automatic document feeder 4 is closed, an undersurface thereof is opposed to the entire area of the upper surface of the placement section 3.

The document feeding tray 41 is located in an upper part of the automatic document feeder 4. A plurality of sheets of the document R can be placed on the document feeding tray 41. The document R is placed on the document feeding tray 41 such that a side of the document R to be read faces upward. The document feeding tray 41 includes a document detecting section. The document detecting section detects whether or not the document R is placed on the document feeding tray 41. Upon detecting the document R, the document detecting section outputs a document detection signal to the controller 6.

The conveyance section 42 includes a conveyance roller pair and a guide plate 42a. The conveyance roller pair conveys the document R to the upper surface of the second contact glass 32. In a situation in which a plurality of sheets of the document R are placed on the document feeding tray 41, the conveyance roller pair successively conveys the plurality of sheets of the document R to the upper surface of the second contact glass 32.

When the automatic document feeder 4 is closed, the guide plate 42a forms a first guide section together with a left part of the frame 34 of the placement section 3. The first guide section guides the document R conveyed by the conveyance roller pair to the upper surface of the second contact glass 32. Further, when the automatic document feeder 4 is closed, the guide plate 42a forms a second guide section together with the partition 33. The second guide section guides the document R guided to the upper surface of the second contact glass 32 toward the document exit tray. The document exit tray is located below the document feeding tray 41. A plurality of sheets of the document R can be placed on the document exit tray.

The contact section 43 has a plate-like shape. The contact section 43 is located at an undersurface of the automatic document feeder 4. A main surface of the contact section 43 facing downward presses the entire area of the first contact glass 31 uniformly. As a result, displacement of the document R or the identification medium D placed on the first contact glass 31 is prevented. The contact section 43 is white in color.

Figure 3:
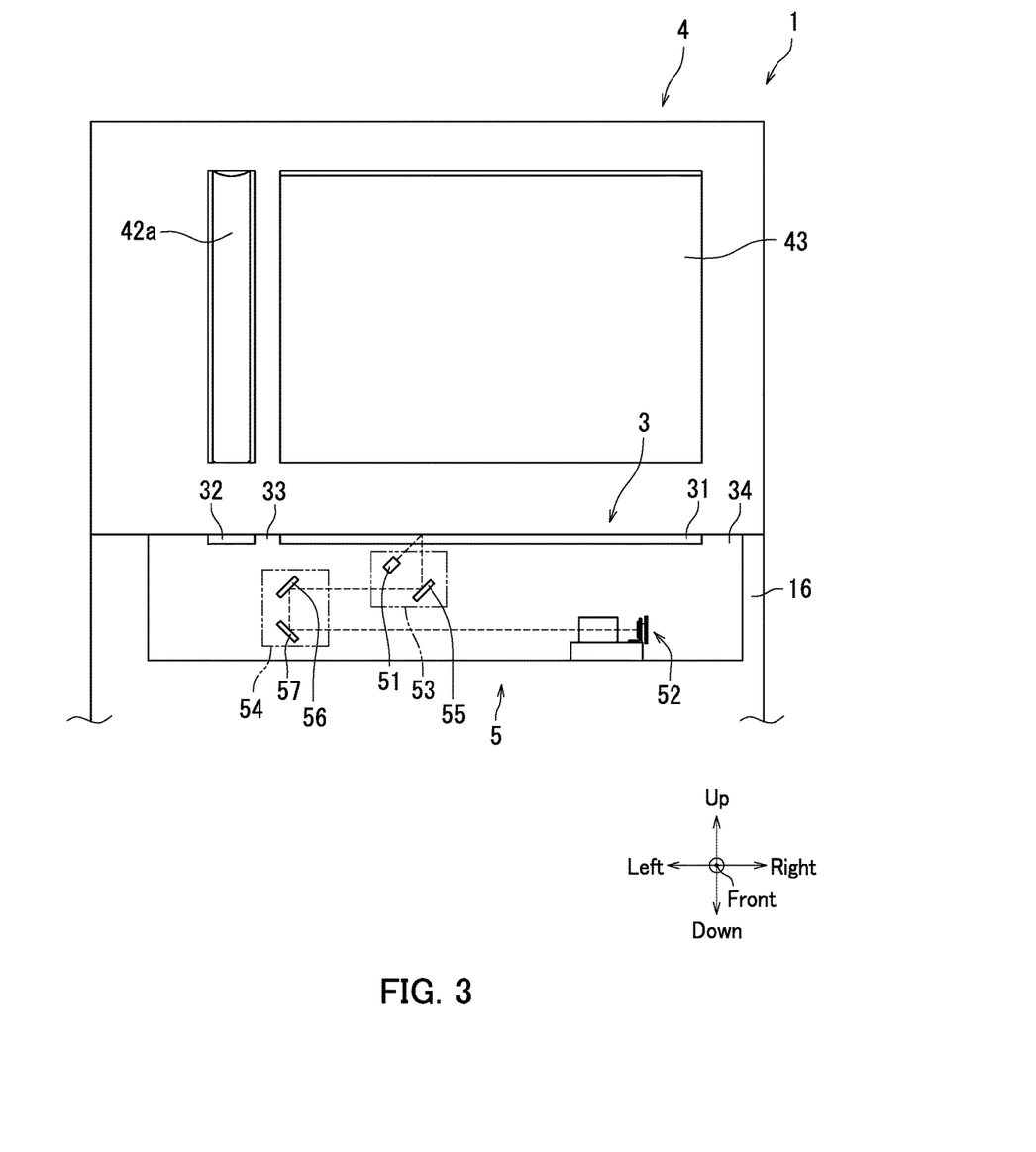
FIG. 3 is a front view schematically illustrating the image reading device illustrated in FIG. 7.

FIG. 3 is a front view schematically illustrating the image reading device 16. FIG. 3 illustrates the image reading device 16 partially in cross section. As illustrated in FIG. 3, the image reading device 16 further includes a reader 5. The reader 5 includes a light source 51, a light receiver 52, a first moving section 53, a second moving section 54, a first mirror 55, a second mirror 56, and a third mirror 57.

The light source 51 is located below the first contact glass 31 and the second contact glass 32. The light source 51 emits light above the first contact glass 31 or the second contact glass 32 through the first contact glass 31 or the second contact glass 32. The light source 51 includes a plurality of light emitting elements. The plurality of light emitting elements are arranged side by side in the front-rear direction.

The first moving section 53 supports the light source 51 and the first mirror 55. The first moving section 53 can be moved by for example driving force generated by a motor. The first moving section 53 is movable in the left-right direction along a guide section provided inside the image reading device 16. The first moving section 53 is capable of moving the light source 51 from a standby position to the right end of the first contact glass 31. Also, the first moving section 53 is capable of moving the light source 51 from the standby position to the underneath of the second contact glass 32. The standby position is set beneath the partition 33.

The second moving section 54 supports the second mirror 56 and the third mirror 57. The second moving section 54 can be moved by for example driving force generated by a motor. The second moving section 54 is movable in the left-right direction along a guide section provided inside the image reading device 16.

The first mirror 55 receives light emitted from the light source 51 and reflected by the document R or the identification medium D. The first mirror 55 is tilted at a predetermined angle. The first mirror 55 changes a direction of the received reflection light horizontally leftward. The second mirror 56 receives the reflection light the direction of which has been changed by the first mirror 55. The second mirror 56 is tilted at a predetermined angle. The second mirror 56 changes the direction of the received reflection light downward in the up-down direction. The third mirror 57 receives the reflection light the direction of which has been changed by the second mirror 56. The third mirror 57 is tilted at a predetermined angle. The third mirror 57 changes the direction of the received reflection light horizontally rightward. The first through third mirrors 55 to 57 each have a plate-like shape elongate in the front-rear direction.

The light receiver 52 is located in a lower part of the image reading device 16. The light receiver 52 includes a lens and an imaging section. The lens is elongate in the front-rear direction. The imaging section includes a plurality of image sensors. The image sensors each are for example a charge coupled device (CCD). The plurality of image sensors are arranged side by side in the front-rear direction. The reflection light the direction of which has been changed by the third mirror 57 is received by the image sensors via the lens.

The reader 5 reads the document R and the identification medium D and generates image data. The reader 5 reads images of the document R and the identification medium D by moving the light source 51 and the first through third mirrors 55 to 57 using the first and second moving sections 53 and 54.

When reading an image of the document R or the identification medium D placed on the first contact glass 31, the light source 51 is moved rightward from the standby position. When reading an image of the identification medium D placed on the second contact glass 32 or an image of the document R conveyed by the conveyance section 42, the light source 51 is moved leftward from the standby position.

When reading an image, the reader 5 emits light from the light source 51. The light emitted from the light source 51 is reflected by the document R or the identification medium D. The reflection light reflected by the document R or the identification medium D is received by the light receiver 52 via the first through third mirrors 55 to 57. As a result, an image of the document R or the identification medium D is captured by the light receiver 52. The reader 5 generates image data based on the captured image. The image data is output to the controller 6.

Figure 4:
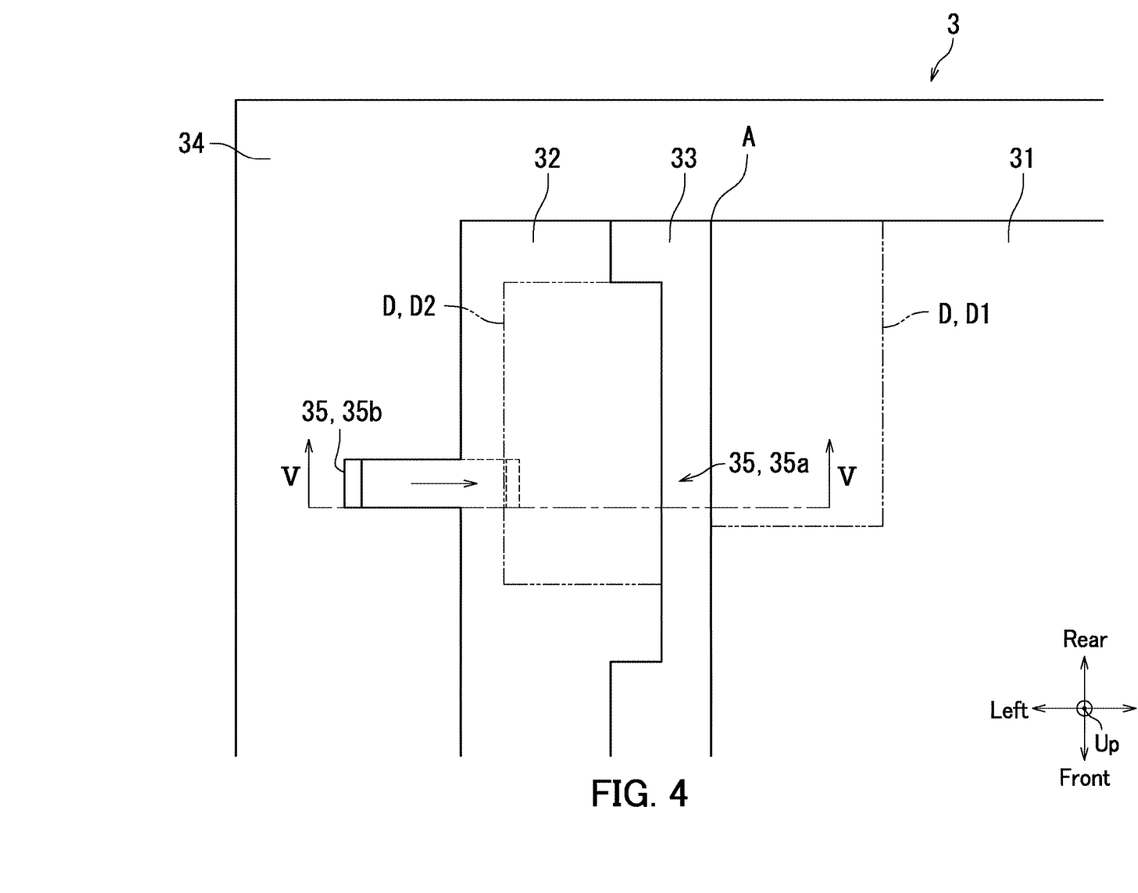
FIG. 4 is a plan view schematically illustrating a placement section illustrated in FIG. 3.

FIG. 4 is a plan view schematically illustrating the placement section 3. Specifically, FIG. 4 is a plan view illustrating a vicinity of a left rear part of the placement section 3. A dash-dot-dot line D1 in FIG. 4 indicates an identification medium D placed at a first placement position on the first contact glass 31. The first placement position is set on the first contact glass 31. Hereinafter, the identification medium D placed at the first placement position will be referred to as the identification medium D1. The first placement position is a position on the first contact glass 31 at which the document R or the identification medium D is placed by referencing the reference point A.

A dash-dot-dot line D2 in FIG. 4 indicates an identification medium D placed at a second placement position on the second contact glass 32. The second placement position is set on the second contact glass 32. Hereinafter, the identification medium D placed at the second placement position will be referred to as the identification medium D2. The second placement position is a position on the second contact glass 32 at which the identification medium D is placed.

As illustrated in FIG. 4, the placement section 3 further includes a displacement restricting section 35. The displacement restricting section 35 restricts displacement of the identification medium D2 from the second placement position. The displacement restricting section 35 includes the partition 33 having a cut-out 35a and a contact portion 35b. The cut-out 35a is formed for example by cutting out a part of the partition 33 so as to correspond to the shape of the identification medium D. The cut-out 35a in the present embodiment has a rectangular shape in plan view. Specifically, the cut-out 35a is defined by a long side parallel to an edge of the partition 33 and a pair of short sides extending parallel to other edges of the partition 33 from respective opposite ends of the long side. The identification medium D is placed on the second contact glass 32 such that a corner of the identification medium D is in contact with a rear corner of the cut-out 35a. As a result, rightward and rearward displacement of the identification medium D (identification medium D2) placed at the second placement position is restricted.

Figure 5:
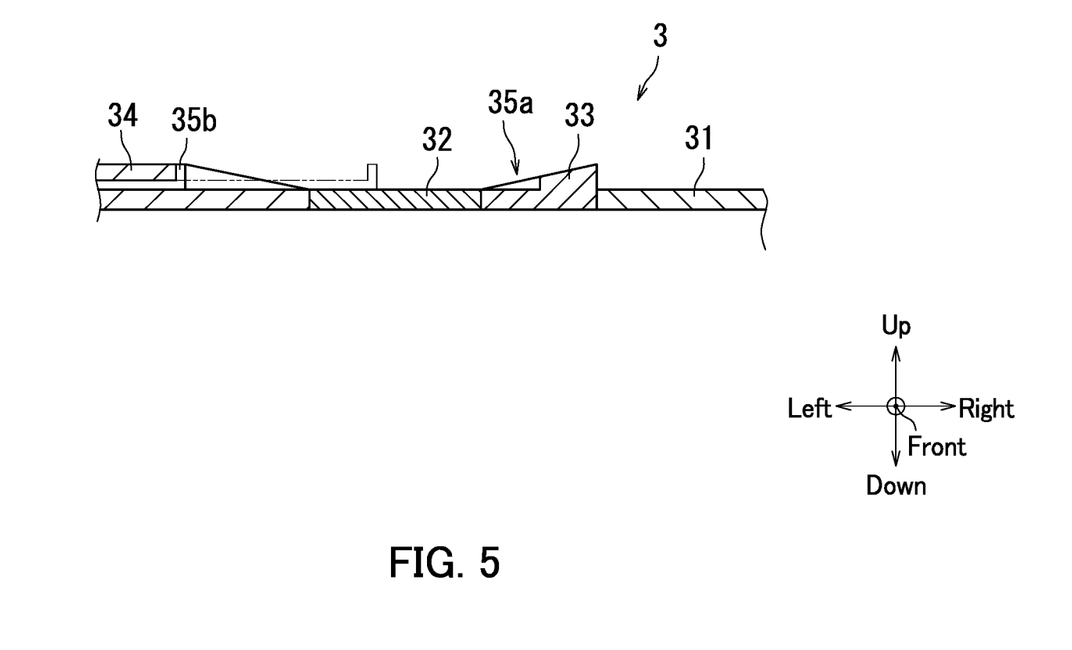
FIG. 5 is a cross-sectional view taken along a line V-V in FIG. 4.

FIG. 5 is a cross-sectional view taken along a line V-V in FIG. 4. As illustrated in FIG. 5, the contact portion 35b has a L-shape in a front view. The contact portion 35b is located in a left part of the frame 34 of the placement section 3. The contact portion 35b is moved for example by a user in the left-right direction on the upper surface of the second contact glass 32. When the contact portion 35b is in contact with the identification medium D2, the contact portion 35b restricts leftward displacement of the identification medium D2.

Figure 6:
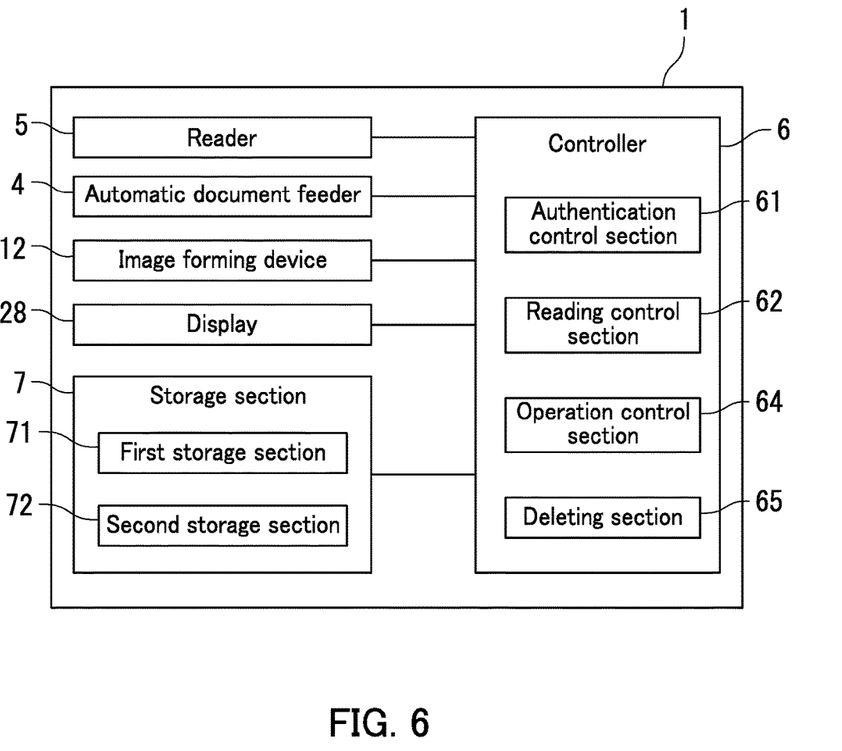
FIG. 6 is a block diagram illustrating a configuration of the image forming apparatus illustrated in FIG. 1.

FIG. 6 is a block diagram illustrating a configuration of the image forming apparatus 1. As illustrated in FIG. 6, the controller 6 functions as an authentication control section 61, a reading control section 62, an operation control section 64, and a deleting section 65 through execution of control programs stored in the storage section 7. The controller 6 includes for example a central processing unit (CPU).

The storage section 7 includes a first storage section 71 and a second storage section 72. The first storage section 71 includes semiconductor memories such as a read only memory (ROM) and a random access memory (RAM). The ROM stores therein for example various control programs to be executed by the controller 6. The RAM stores therein via the controller 6 for example image data of the document R and image data of the identification medium D. The second storage section 72 includes for example a hard disk drive. Personal data that has been input in advance is stored in the second storage section 72.

The reading control section 62 controls the reader 5. For example, when a copy start signal is input, the reading control section 62 controls the reader 5 to start reading the document R or the identification medium D. The reading control section 62 changes operation for reading the document R and the identification medium D depending on the document detection signal input from the automatic document feeder 4. Specifically, in a situation in which the document detection signal has not been input, the reading control section 62 causes the light source 51 to move leftward from the standby position. As a result, the reader 5 reads an image of the identification medium D2 placed on the second contact glass 32 and generates image data of the identification medium D2. After the reader 5 has read the image of the identification medium D2, the reading control section 62 causes the light source 51 to move rightward. As a result, the reader 5 reads an image of the document R and generates image data of the document R. The reading control section 62 causes the RAM of the first storage section 71 to store therein the image data of the document R and the image data of the identification medium D2.

In a situation in which the document detection signal has been input, the reading control section 62 causes the light source 51 to move rightward from the standby position. As a result, the reader 5 reads an image of the identification medium D1 placed on the first contact glass 31 and generates image data of the identification medium D1. After the reader 5 has read the image of the identification medium D1, the reading control section 62 causes the light source 51 to move to the left of the standby position and to stop below the second contact glass 32. Thereafter, the reading control section 62 causes the automatic document feeder 4 to successively convey one or more sheets of the document R placed on the document feeding tray 41. As a result, the reader 5 successively reads images of the one or more sheets of the document R and generates image data of the one or more sheets of the document R. The reading control section 62 causes the RAM of the first storage section 71 to store therein the image data of the one or more sheets of the document R and the image data of the identification medium D1.

When the image data of the identification medium D is stored in the first storage section 71, the authentication control section 61 starts authentication of a user of the image forming apparatus 1. The authentication control section 61 performs the authentication of the user based on the image data of the identification medium D stored in the first storage section 71 and personal data stored in the second storage section 72. Specifically, the authentication control section 61 recognizes for example an employee number from the image data of the identification medium D using a character recognition function. The authentication control section 61 compares the recognized employee number with a plurality of employee numbers that have been input as the personal data in advance. In a situation in which the recognized employee number is identical with any of the plurality of employee numbers, the authentication control section 61 generates authentication information that indicates authentication success. "Authentication success" means that the authentication has succeeded. In a situation in which the recognized employee number is identical with none of the plurality of employee numbers, the authentication control section 61 generates authentication information that indicates authentication failure. "Authentication failure" means that the authentication has failed.

When the authentication information that indicates authentication success is generated, the image forming device 12 forms on paper S an image corresponding to the image data of the document R stored in the first storage section 71 under control by the operation control section 64. In other words, the operation control section 64 does not activate the image forming device 12 when the authentication information that indicates authentication failure is generated. Therefore, when the authentication information that indicates authentication failure is generated, the image forming apparatus 1 of the present embodiment does not form the image corresponding to the image data of the document R stored in the first storage section 71.

The deleting section 65 deletes the image data of the document R and the image data of the identification medium D stored in the first storage section 71. In a situation in which the document detection signal has not been input and the authentication information that indicates authentication failure is generated, the deleting section 65 deletes the image data of the document R and the image data of the identification medium D from the first storage section 71. Also, in a situation in which the document detection signal has been input and the authentication information that indicates authentication failure has been input more than a predetermined number of times, the deleting section 65 deletes the image data of the document R and the image data of the identification medium D from the first storage section 71.

Figure 7:
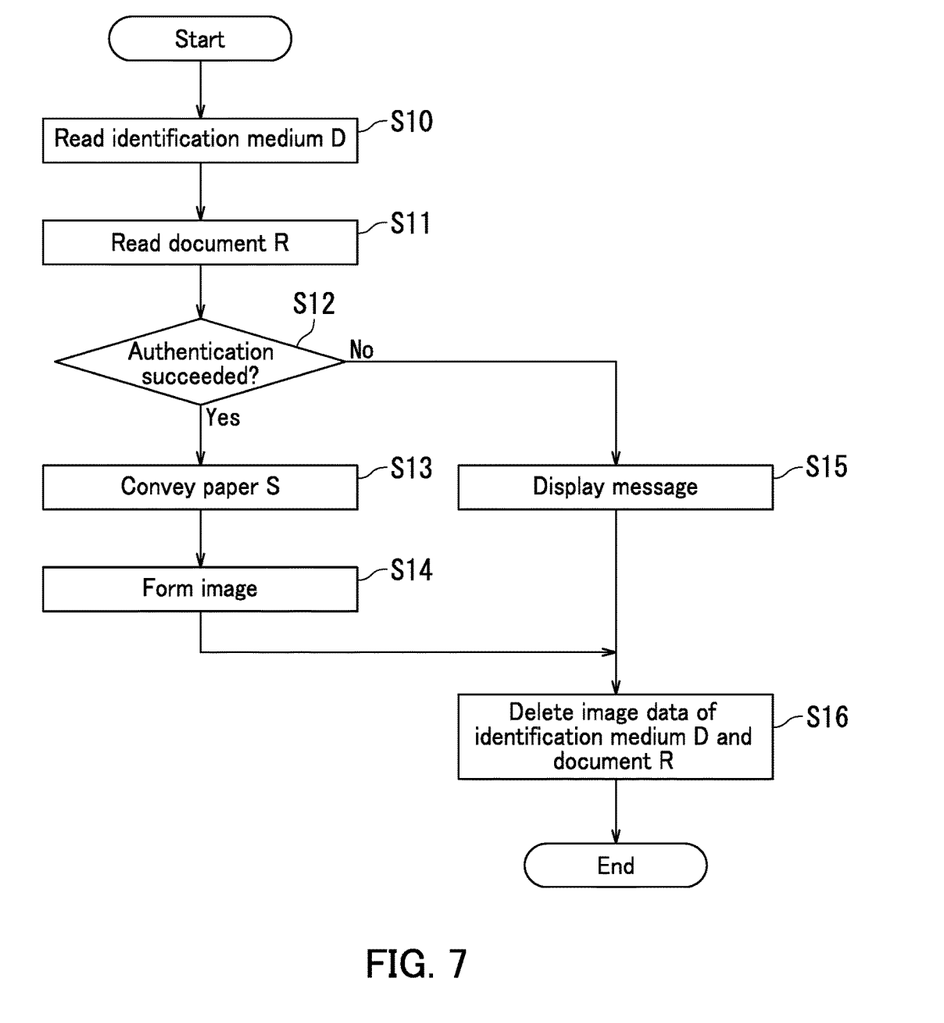
FIG. 7 is a flowchart illustrating reading control performed by a controller illustrated in FIG. 6.
Figure 8:
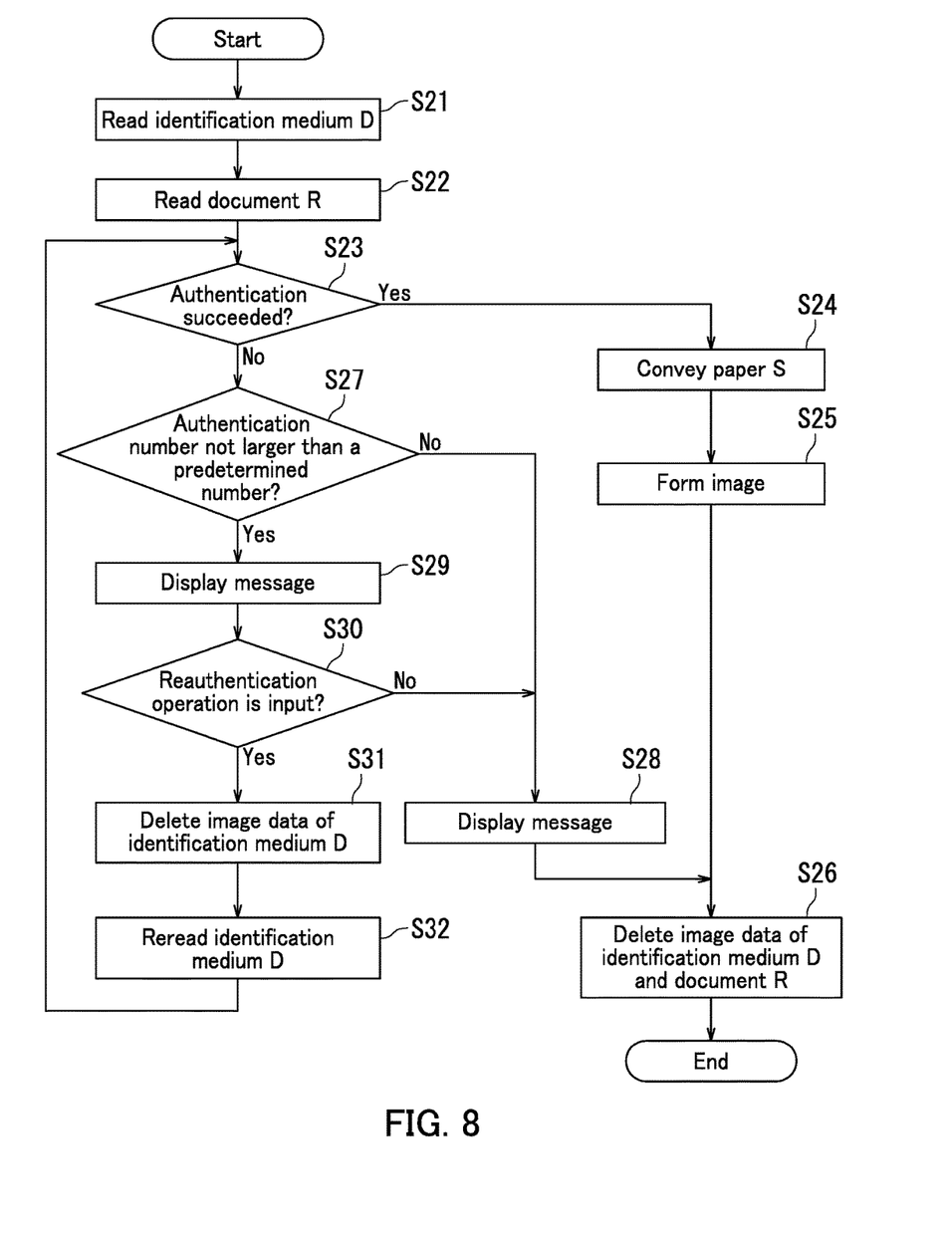
FIG. 8 is a flowchart illustrating reading control performed by the controller illustrated in FIG. 6.

Next, the following describes reading control performed by the controller 6 with reference to FIGS. 7 and 8. FIGS. 7 and 8 are flowcharts illustrating the reading control performed by the controller 6. Specifically, FIG. 7 is a flowchart illustrating reading control performed in a situation in which the document detection signal has not been input. FIG. 8 is a flowchart illustrating reading control performed in a situation in which the document detection signal has been input.

Initially, the reading control performed in a situation in which the document detection signal has not been input will be described with reference to FIG. 7. The reading control illustrated in FIG. 7 is performed when the image forming apparatus 1 executes the copy function. As illustrated in FIG. 7, when an operation signal for starting copying is input in a situation in which the document detection signal has not been input, the controller 6 executes the following steps S10 to S16.

At step S10, reading of the identification medium D2 started. As a result, image data of the identification medium D2 is generated.

When the reading of the identification medium D2 is completed at step S10, reading of the document R is started at step S11. As a result, image data of the document R is generated.

At step S12, authentication of a user is performed based on the image data of the identification medium D2.

When authentication information that indicates authentication success is generated at step S12 (Yes at step S14 paper S is conveyed from the accommodation section 11 at step S13.

At step S14, an image is formed on the paper S based on the image data of the document R.

After the image is formed on the paper S at step S14, the image data of the document R and the image data of the identification medium D2 stored in the first storage section 71 are deleted at step S16.

When authentication information that indicates authentication failure is generated at step S12 (No at step S12), a message such as "Authentication failed." is displayed on the display 28 at step S15.

After the message is displayed at step S15, the image data, of the document R and the image data of the identification medium D2 stored in the first storage section 71 are deleted at step S16.

Next, the reading control performed in a situation in which the document detection signal has been input will be described with reference to FIG. 8. The reading control illustrated in FIG. 8 is performed when the image forming apparatus 1 executes the copy function. When an operation signal for starting copying is input in a situation in which the document detection signal has been input, the controller 6 executes the following steps S21 to S32 as illustrated in FIG. 8.

At step S21, reading of the identification medium D1 is started. As a result, image data of the identification medium D1 is generated.

When the reading of the identification medium D1 is completed at step S21, successive reading of one or more sheets of the document R is started at step S22. As a result, image data of the one or more sheets of the document R is generated.

At step S23, authentication of a user is performed based on the image data of the identification medium D1.

When authentication information that indicates authentication success is generated at step S23 (Yes at step S23), paper S is conveyed from the accommodation section 11 at step S24.

At step S25, an image is formed on the paper S based on the image data of each of the one or more sheets of the document R.

After the image is formed on the paper S at step S25, the image data of the one or more sheets of the document R and the image data of the identification medium D1 stored in the first storage section 71 are deleted at step S26.

When authentication information that indicates authentication failure is generated at step S23 (No at step S23), it is determined at step S27 whether or not an authentication number that indicates the number of times authentication has been performed is not larger than a predetermined number.

When it is determined at step S27 that the authentication number is larger than the predetermined number (No at step S27), a message such as "Unable to perform reauthentication," is displayed on the display 28 at step S28.

After the message is displayed at step S28, the image data of the one or more sheets of the document R and the image data of the identification medium D1 stored in the first storage section 71 are deleted at step S26.

When it is determined at step S27 that the authentication number is not larger than the predetermined number (Yes at step S27), a message such as "Try reauthentication?" is displayed on the display 28 at step S29 after completion of the reading of the one or more sheets of the document R.

After the message is displayed at step S29, a predetermined time period is measured at step S30.

When an operation signal for starting authentication is not input in the predetermined time period at step S30 (No at step S30), a message such as "Unable to copy." is displayed on the display 28 at step S28.

After the message is displayed at step S28, the image data of the one or more sheets of the document R and the image data of the identification medium D1 stored in the first storage section 71 are deleted at step S26.

In a situation in which the identification medium D1 is placed again by the user and the operation signal for starting reauthentication is input in the predetermined time period at step S30 (Yes at step S30), the image data of the identification medium D1 stored in the first storage section 71 is deleted at step S31.

After the deletion of the image data of the identification medium D1 at step S31, reading of the identification medium D1 is started at step S32, and the process returns to step S23.

In the image forming apparatus 1 of the present embodiment, reading of the document R is started when the document R and the identification medium D are set and authentication of a user is being performed. Therefore, the user need not perform an operation for setting the document R in place of the identification medium D after only the identification medium D is read. As a result, the image forming apparatus 1 can read the document R with a reduced number of operations.

Further, in the image forming apparatus 1 of the present embodiment, in a situation in which one or more sheets of the document R are placed on the document feeding tray 41 of the automatic document feeder 4, the one or more sheets of the document R are successively read and image data thereof is stored in the first storage section 71 regardless of success or failure of authentication of the user. Therefore, even when authentication has failed, the user need not perform an operation for making the document R read again.

Through the above, the image reading device 16 and the image forming apparatus 1 according to the embodiments of the present disclosure have been described with reference to FIGS. 1 to 8. However, the present disclosure is not limited to the above-described embodiments and is practicable in various manners within a scope not departing from the gist of the present disclosure.

For example, the present disclosure is not limited to the above-described embodiments in which the image data of the identification medium D is generated by reading all parts of the identification medium D. In a configuration of the embodiments of the present disclosure, the image data of the identification medium D may be generated by reading only a part of the identification medium D. In this configuration, the reader 5 reads a part of the personal data such as the employee number or the face photograph printed on the identification medium D. Specifically, when the identification medium D is placed at the first placement position or the second placement position, the part of the personal data printed on the identification medium D is located within a predetermined area. The reader 5 reads only a part of the identification medium D located within the predetermined area. As a result, only the part of the personal data is read. In this configuration, a size of the image data of the identification medium D is reduced and a time it takes to read the identification medium D is also reduced.

Also, the present disclosure is not limited to the above-described embodiments in which the personal data is stored in the second storage section 72. For example, the personal data may be received from a server device outside the image forming apparatus 1 to perform authentication.

Further, the present disclosure is not limited to the above-described embodiments in which the controller 6 functions as the authentication control section 61 and performs authentication of a user based on the image data of the identification medium D stored in the first storage section 71 and the personal data stored in the second storage section 72. The present disclosure may be embodied as an image forming system 90 including an image forming apparatus 91 and a server device 92.

Figure 9:
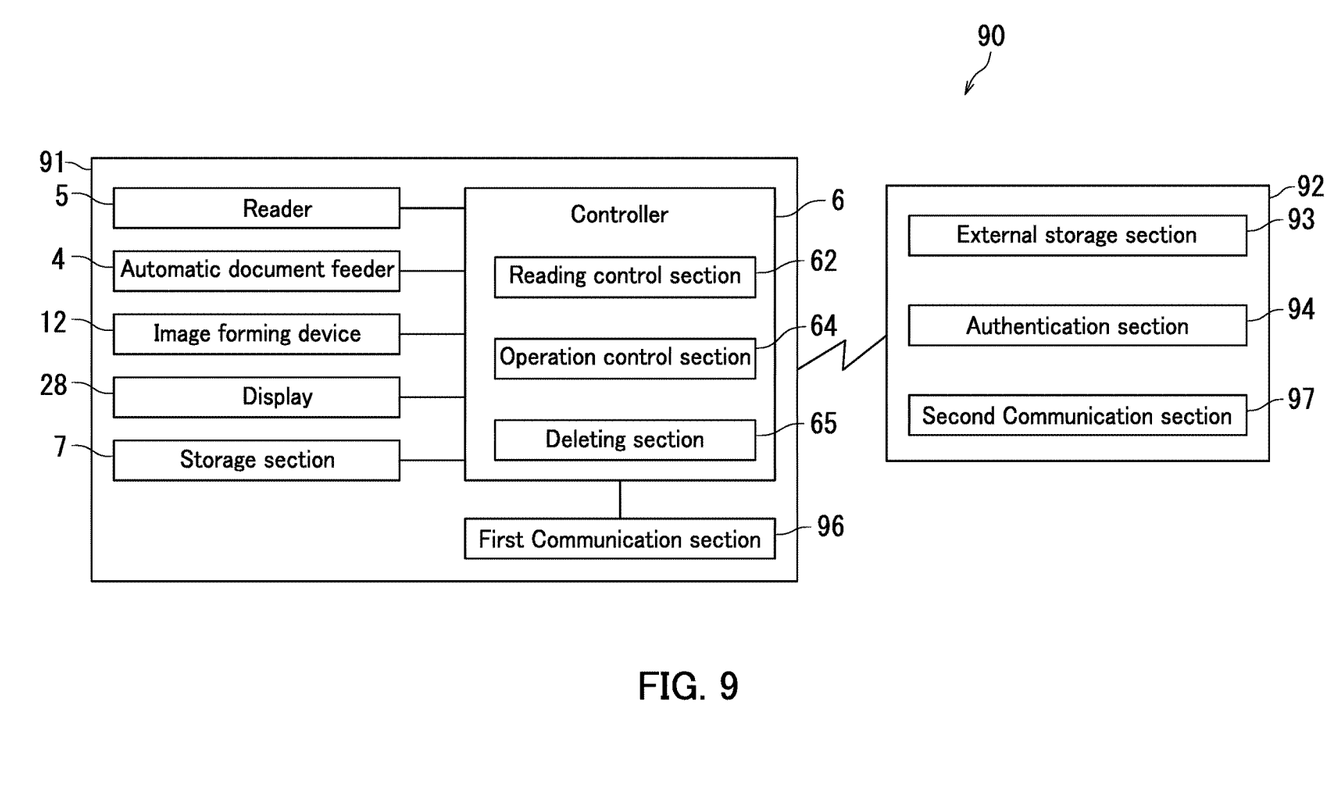
FIG. 9 is a block diagram illustrating a configuration of an image forming system according to another embodiment of the present disclosure.

FIG. 9 is a block diagram illustrating a configuration of the image forming system 90 according to another embodiment of the present disclosure. As illustrated in FIG. 9, the image forming system 90 includes the image forming apparatus 91, the server device 92, and an external storage section 93.

The image forming apparatus 91 differs from the image forming apparatus 1 of the above-described embodiment of the present disclosure in that the image forming apparatus 91 does not perform an authentication process. A controller 6 of the image forming apparatus 91 differs from the controller 6 of the image forming apparatus 1 in that the controller 6 of the image forming apparatus 91 does not function as the authentication control section 61. A storage section 7 of the image forming apparatus 91 differs from the storage section 7 of the image forming apparatus 1 in that personal data is not stored in the storage section 7 of the image forming apparatus 91. Also, the image forming apparatus 91 further includes a first communication section 96.

The server device 92 includes a second communication section 97. The server device 92 is connected to the image forming apparatus 91 via a communication network. The communication network is for example the Internet or a dedicated line. The first communication section 96 sends image data of an identification medium D to the second communication section 97 via the communication network. The second communication section 97 sends authentication information that indicates a result of authentication to the first communication section 96 via the communication network.

Personal data of a plurality of individuals is stored in the external storage section 93 in advance. Image data of an identification medium D generated by a reader 5 of the image forming apparatus 91 is sent to the server device 92 via the first communication section 96. The server device 92 causes the external storage section 93 to store therein the image data of the identification medium D. Also, the server device 92 further includes a controller. The controller of the server device 92 functions as an authentication section 94 through execution of a control program stored in the external storage section 93.

The authentication section 94 performs authentication of a user based on the personal data and the image data of the identification medium D stored in the external storage section 93. The authentication section 94 sends the authentication information that indicates a result of the authentication of the user to the image forming apparatus 91 via the second communication section 97. The controller 6 of the image forming apparatus 91 performs authentication control based on the authentication information received by the first communication section 96. Since the personal data is not stored in the image forming apparatus 91, the personal data is protected by the image forming system 90.

The drawings schematically illustrate elements of configuration in order to facilitate understanding, and properties of elements of configuration illustrated in the drawings, such as thicknesses and lengths thereof, may differ from actual properties thereof in order to facilitate preparation of the drawings. Furthermore, properties of the elements of configuration described in the above embodiments, such as shapes, are merely examples and are not intended as specific limitations. Various alterations may be made so long as there is no substantial deviation from the effects of the present disclosure.

What is claimed is:

1. An image reading device comprising:
  a placement section on which a document and an identification medium are to be placed;
  a reader configured to read the document and the identification medium and to generate image data of the document and image data of the identification medium;
  an authentication control section configured to perform authentication of a user based on the image data of the identification medium and to generate authentication information that indicates a result of the authentication of the user; and
  a reading control section configured to control the reader, wherein
  the reading control section controls the reader to read the document after generating the image data of the identification medium, a first placement position at which the document or the identification medium is to be placed and a second placement position at which the identification medium is to be placed are located in the placement section, the identification medium has a rectangular plate-like shape, the placement section includes a displacement restricting section that restricts displacement of the identification medium from the second placement position, the placement section includes a first contact glass and a second contact glass, the document or the identification medium is placed on the first contact glass, the identification medium is placed on the second contact glass, the first placement position is located on the first contact glass, the second placement position is located on the second contact glass, the image reading device further comprising an automatic document feeder configured to successively convey one or more sheets of the document to the placement section, the automatic document feeder conveys the document to an upper surface of the second contact glass, the reading control section controls the automatic document feeder to successively convey one or more sheets of the document and controls the reader to successively read the one or more sheets of the document, and the reading control section controls the reader to read the document placed on the first contact glass.

2. The image reading device according to claim 1, wherein after the image data of the identification medium is generated by the reader, the reading control section controls the automatic document feeder to successively convey one or more sheets of the document and controls the reader to successively read the one or more sheets of the document.

3. The image reading device according to claim 1, further comprising a first storage section configured to store therein the image data of the document and the image data of the identification medium.

4. The image reading device according to claim 3, further comprising a deleting section configured to delete the image data of the document and the image data of the identification medium stored in the first storage section, wherein the deleting section deletes the image data of the document and the image data of the identification medium stored in the first storage section when the authentication control section has generated authentication information that indicates authentication failure more than a predetermined number of times.

5. The image reading device according to claim 1, further comprising a second storage section storing personal data therein, wherein the authentication control section performs the authentication of the user based on the image data of the identification medium and the personal data.

6. The image reading device according to claim 1, wherein the placement section further includes a partition, the partition is located between the first contact glass and the second contact glass, the displacement restricting section has a contact portion and a cut-out in the partition, the cut-out has a shape that corresponds to the shape of the identification medium, and when the contact portion is in contact with the identification medium, the contact portion restricts displacement of the identification medium.

7. The image reading device according to claim 6, wherein the cut-out has a rectangular shape, and the identification medium is placed at the second placement position in a manner that a corner of the identification medium is in contact with a corner of the cut-out.

8. The image reading device according to claim 1, wherein the reader generates the image data of the identification medium by reading a part of the identification medium.

9. An image forming apparatus comprising:

the image reading device according to claim 1; and an image forming device configured to form an image on a recording medium based on the image data of the document.

10. The image forming apparatus according to claim 9, further comprising an operation control section configured to control the image forming device, wherein the operation control section controls the image forming device to form the image on the recording medium when authentication information that indicates authentication success has been generated.

11. An image forming system comprising:

an image forming apparatus; and a server device connected to the image forming apparatus via a communication network, wherein the image forming apparatus includes:

an image reading device;

an image forming device that forms an image on a recording medium based on image data of a document; and a first communication section that sends image data of an identification medium to the server device, the image reading device includes:

a placement section on which the document and the identification medium are to be placed;

a reader that reads the document and the identification medium and generates the image data of the document and the image data of the identification medium; and a reading control section that controls the reader, a first placement position at which the document or the identification medium is to be placed and a second placement position at which the identification medium is to be placed are located in the placement section, the identification medium has a rectangular plate-like shape, the placement section includes a displacement restricting section that restricts displacement of the identification medium from the second placement position, the placement section includes a first contact glass and a second contact glass, the document or the identification medium is placed on the first contact glass, the identification medium is placed on the second contact glass, the first placement position is located on the first contact glass, the second placement position is located on the second contact glass, the image reading device further includes an automatic document feeder configured to successively convey one or more sheets of the document to the placement section, the automatic document feeder conveys the document to an upper surface of the second contact glass, the reading control section controls the automatic document feeder to successively convey one or more sheets of the document and controls the reader to successively read the one or more sheets of the document, the reading control section controls the reader to read the document placed on the first contact glass, the server device includes:
- an external storage section storing personal data therein;
- an authentication section that, when receiving the image data of the identification medium from the image forming apparatus, performs authentication of a user based on the personal data and the image data of the identification medium and generates authentication information that indicates a result of the authentication of the user; and
- a second communication section that sends the authentication information to the image forming apparatus, and the reading control section controls the reader to read the document after generating the image data of the identification medium.

* * * * *